United States Patent [19]

Kirby

[11] Patent Number: 4,805,855

[45] Date of Patent: Feb. 21, 1989

[54] BAR HANGER FOR HANGING CONDUITS OR THE LIKE

[76] Inventor: Thomas S. Kirby, 205 Colman Rd., Soddy, Tenn. 37349

[21] Appl. No.: 134,700

[22] Filed: Dec. 18, 1987

[51] Int. Cl.⁴ .............................................. F16L 3/00
[52] U.S. Cl. .......................................... 248/58; 52/39; 411/392; 411/400
[58] Field of Search ...................... 248/58; 52/39, 550; 411/400, 401, 392, 394, 487

[56] References Cited

U.S. PATENT DOCUMENTS

| 1,464,982 | 8/1923 | Ferris | 248/317 |
| 2,639,010 | 5/1953 | Weber | 52/550 |
| 3,870,487 | 3/1975 | Hurlbut, Sr. et al. | 248/58 X |
| 3,960,350 | 6/1976 | Tardoskegyi | 248/59 X |
| 4,544,119 | 10/1985 | Kellett et al. | 248/58 |
| 4,638,965 | 1/1987 | De Bruine et al. | 248/59 |

FOREIGN PATENT DOCUMENTS

| 1086287 | 9/1980 | Canada | 52/39 |
| 2628324 | 1/1977 | Fed. Rep. of Germany | 411/401 |
| 978964 | 12/1950 | France | 411/401 |

Primary Examiner—J. Franklin Foss
Assistant Examiner—David L. Talbott
Attorney, Agent, or Firm—Alan Ruderman

[57] ABSTRACT

A bar hanger having an elongated head and an elongated tail extending downwardly from the head. The tail has a first portion normal to the head, a second portion inclined relatively to the first portion, and a third portion inclined relatively to the second portion so that the first and second portions are parallel. The third portion has a free end with a threaded connecting element. The tail and the head lie substantially in a common plane and may be slipped through the space between a pair of elongated chords of a building joist such that the head is above the tops of the chords. The hanger may then be rotated 90° so that the head rests on both chords and the free end of the third portion is off-set from the space between the chords for attachment to a conduit hanger so that the conduit can be carried by the joist. The bar hanger permits rapid installation of the conduit hangers and spreads the load over both chords.

8 Claims, 1 Drawing Sheet

U.S. Patent  Feb. 21, 1989  4,805,855
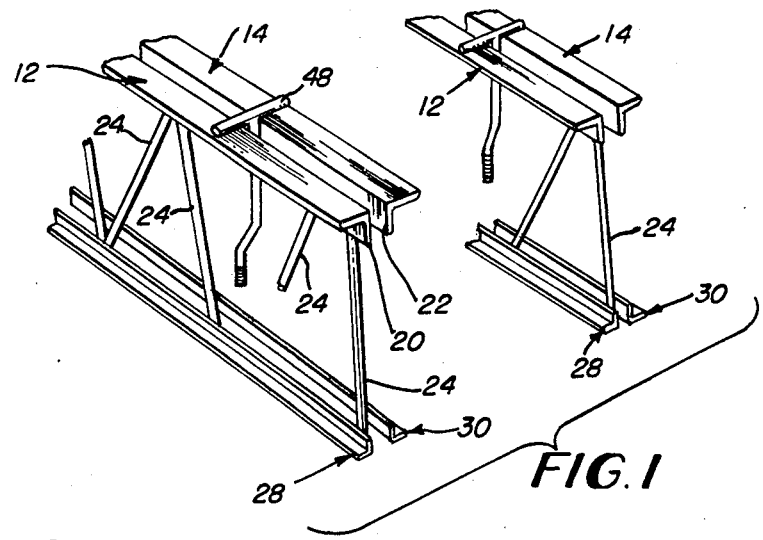
FIG. 1
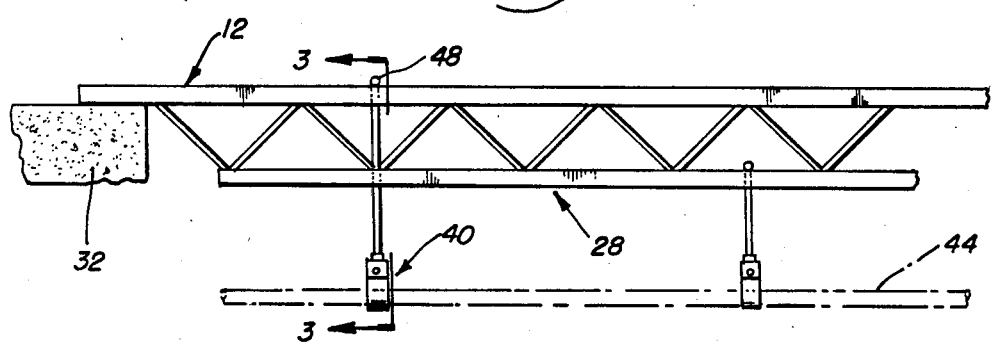
FIG. 2
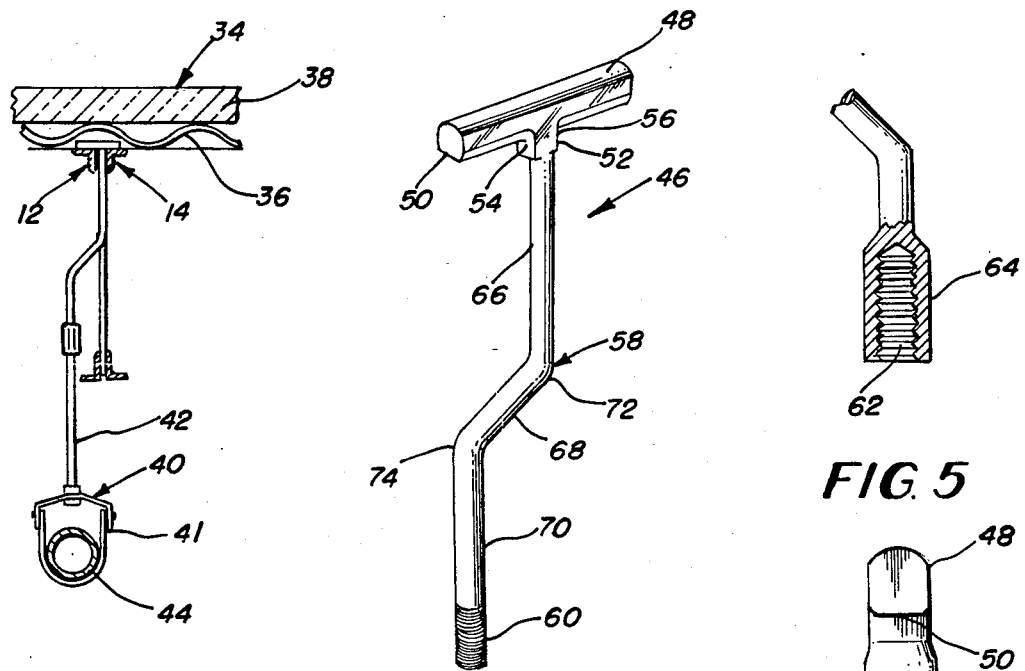
FIG. 3
FIG. 4
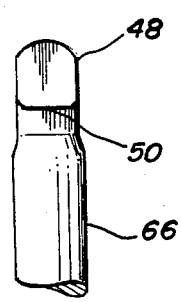
FIG. 5
FIG. 6

BAR HANGER FOR HANGING CONDUITS OR THE LIKE

BACKGROUND OF THE INVENTION

This invention relates to a hanger for use in conjunction with bar joists for supporting conduits or the like from the bar joists, and more particularly to a bar hanger which can be readily disposed on the top of a pair of chords of a bar joist used for supporting the roof, decking or ceiling in a building, the bar hanger being positioned rapidly without the use of tools for supporting the various hanging elements which carry such conduits.

In building structures bar joists spanning columns or the like are utilized for supporting various structures such as decking which carry the roof or ceiling. These bar joists in most buildings comprise a pair of angle beams, known as chords, spaced slightly apart and disposed so that one leg of each beam faces a corresponding leg of the other beam. Additional support to the bar joists are provided by a truss type of brace arrangement fastened to and between the angle beams and to another pair of chords at the bottom of the braces, the lower chords in many cases also being angle irons. Various conduits, such as sewer pipes, water pipes, electrical pipes and the like are supported and carried from the bar joist by means of a conduit hanger which cradles the conduit at the bottom thereof and is attached to the bar joist by means of clamps. These clamps generally have a C-shape configuration including a threaded member which attaches the clamp to one of the chords of the bar joist, and also includes a threaded socket for receiving a threaded rod which is attached to the conduit hanger. In other words, these clamps are similar to C-clamps connected to one of the chords and having a threaded receiver for receiving the threaded rod of the pipe hanging element.

Large buildings have a substantial number of such hangers and clamps, there generally being one approximately every ten feet for supporting fluid carrying pipes. For example, in a large shopping mall, where there are a substantial number of buildings or a single structure in which all the mall facilities are housed, there may be a few million of such hangers and clamps. Each of the clamps is a relatively inexpensive member, but the installation of the clamps can be quite time consuming and thus costly. In the aforesaid prior art clamps, the installation of each requires that each clamp be tightened on to the bar joist or chord flange, and then the threaded rod of the conduit hanger must be connected to the clamp. Wrenches or similar tools are required to secure the clamp to the bar joist. Moreover, because the clamp is connected to the flange of a single chord of the bar joist, a twisting or torsion results on that top flange so that the load carrying capacity of the bar joist is inefficient. Additionally, over a period of time, vibration in the building tends to loosen or cause the clamps to turn or slip, and sometimes these clamps loosen to the point that they slide off the flange resulting in water damage and the like to the building.

SUMMARY OF THE INVENTION

Accordingly, it is a primary object of the present invention to provide a bar hanger carried by a bar joist which may be disposed in the space between the chords of the bar joist and carried by both chords of the joist, the bar hanger having means at its lower end for carrying the conventional conduit hanger threaded rod.

It is another object of the present invention to provide a bar hanger that may be installed rapidly by slipping between the chords of a bar joist, and thereafter turned so as to be disposed with its lower conduit carrying end laterally spaced from the bar joist for carrying the conduit.

It is a further object of the present invention to provide a bar hanger which may be carried by both chords of a bar joist and trapped therebetween at its upper end, and carrying conduit suspending means at its lower end, the bar joist being unaffected by vibration in the building in which the bar joists are supported.

Accordingly, the present invention provides a bar hanger which is positioned between a pair of chords of a bar joist so as to be supported thereby and hang downwardly for carrying a conduit hanger at its lower extremity, the bar hanger having a securing element at its upper extremity adapted for securely engaging both chords and having a lower extremity angled away from the bar joist for attachment to the conduit hanger. The upper extremity or head of the bar hanger may be positioned by slipping into the space between the chords above the tops thereof and thereafter rotated so as to securely rest on the tops of the joists chords. The lower extremity is off-set relative to the head and has means thereon for attachment to the conduit carrier.

Specifically, the head or top of the bar hanger extends relative to the adjacent portion thereof so as to form a Tee relative thereto and this head is first slipped between the chords of the joist and the bar hanger is then rotated 90° so that the head of the hanger is positioned on and laterally spans the tops of the joist, the lower extremity or tail extending downwardly between the chords and angled away therefrom so as to be in noninterference with the joist while hanging downwardly for attachment to the conduit carrier.

Preferably the bar hanger head is disposed at a 90° angle to an adjacent intermediate depending portion of the tail, and the intermediate portion includes an off-set angled away from the portion of the tail adjacent the head, the off-set portion of the tail having a further off-set extending toward the lower extremity of the tail, the off-sets being such that the lower extremity is disposed in a plane substantially parallel to the plane of the intermediate portion adjacent the head.

Thus, the lower extremity of the tail is positionable for attachment to a conduit hanger in a plane off-set from the plane of the joist and disposed in a vertical plane for carrying hanger. In the preferred mode of the invention, the off-sets of the intermediate portion are both 45° so as to provide for noninterference with the joist while providing maximimum strength to the bar hanger.

BRIEF DESCRIPTION OF THE DRAWINGS

The particular features and advantages of the invention as well as other objects will become apparent from the following description taken in connection with the accompanying drawings, in which:

FIG. 1 is a fragmentary perspective view of a pair of spaced apart bar joists, each carrying a bar hanger constructed in accordance with the principles of the present invention, the hangers being illustrated in the operative position on the top chords of the joists;

FIG. 2 is a fragmentary elevational view illustrating a bar joist having the bar hanger of FIG. 1 supported on the top chords, and a similar hanger supported on the lower chords, the bar hangers carrying respective conduit hangers which carries a conduit;

FIG. 3 is a cross sectional view taken substantially along line 3—3 of FIG. 2 but also illustrating the decking above the joist;

FIG. 4 is an enlarged perspective view of the bar hanger of FIG. 1;

FIG. 5 is a fragmentary elevational view partly in cross section illustrating a modification of the lower extremity of the bar hanger; and FIG. 6 is a fragmentary elevational view of the head and upper end of the tail of the bar hanger, the bar hanger being rotated 90° with respect to that illustrated in FIGS. 3 and 5.

DESCRIPTION OF THE PREFERRED EMBODIMENT

Referring to FIG. 1, a pair of building bar joists 10 are illustrated, each of which comprises a pair of upper chords in the form of angle beams or the like 12, 14, the chords having respective upper substantially horizontal legs 16, 18 and downwardly depending legs 20, 22. The legs 20, 22 are spaced apart a small distance, approximately one-half inch, and one end of braces 24, are welded thereto, the braces being inclined so as to form a truss type of support to strengthen the joists and having lower ends welded in a similar manner to another pair of chords 28, 30. Conventionally, the lower chords, 28, 30 may also be angle beams or may be rods. The ends of the upper chords 12, 14 may be carried on a vertical column, such as illustrated at 32, or a building truss (not illustrated), and generally carries a decking 34 including corrugated panels 36 which provide a space between portions of the joist chords. The panels 36 may support insulating material 38 between the ceiling of one level of the building and the adjacent floor or the roof.

In the prior art in order to support a conduit hanger 40 from the joists, a C-type beam clamp (not illustrated) is attached to one free end of one of the legs 16, 18 and extends away from the other leg, the clamp having a threaded socket for receiving a threaded rod 42 of the conduit hanger or a threaded rod coupled to the rod 42. The threaded rod 42 depends downwardly and carries a conduit hanger cradle 41 which carries the conduit 44. The conduit may carry water, sewage, electrical lines or the like. As aforesaid, not only is it time consuming to connect each clamp to the joist chord because each clamp must be manually attached thereto with the use of wrenches or similar tools, but the load carrying ability of the conduit hangers is less than optimum since the support therefor is only from one leg of a chord. Additionally, the clamps tend to slip as bolt relaxation occurs, and building vibration may accelerate this effect. This may result in turning or slipping of the clamp to the extent of falling off the chord. If this results, the conduit can fail resulting in water damage or the like. Also since the conduits are carried by one leg or flange of a chord, torsional or bending effects can occur.

Accordingly, the present invention provides a bar hanger 46 which may be securely carried by both chords of a joist and which may be installed substantially quicker than the conventional beam clamp. One estimate is that five bar hangers 46 may be installed in the same time as it takes to install one conventional beam clamp.

The bar hanger 46 comprises a head 48 which may be in the form of a rod, preferably approximately 2¼ to 2½ inches in length, and of a cross sectional dimension sufficient for carrying its intended load, but slightly narrower than the space between the legs 20, 22 of the chords 12, 14. The cross sectional configuration is not critical although it may be preferable that the lower edge 50, as illustrated in FIG. 6, be flat to conform to the top surface of the legs 16, 18. Additionally, the head 48 preferably may include a neck 52 depending therefrom at substantially the central portion of the head and in that case the neck may include a pair of planar surfaces 54, 56 for purposes of aligning the hanger in the operative position.

Depending downwardly from the central portion of the head 48, or the neck 52 if a neck is utilized, is the tail portion 58 of the hanger. The tail portion may be a rod having a circular configuration including external threads 60 formed at least partially thereon at the free extremity thereof, as illustrated in FIG. 4, or alternatively may have internal threads 62 formed in a socket portion 64 at the free end, as illustrated in FIG. 5. An advantage of the latter construction is that the tail and head may be formed, as by casting or molding, as a unit and the threads thereafter tapped or the socket welded to the tail. If the tail has external threads thereon, in all probability the tail would be attached by welding to the head or the neck.

The tail 58 comprises a first portion 66 depending downwardly from adjacent the head 48 substantially normal thereto, a second portion 68 extending from the first portion remote from the head and off-set at an inclination to the first portion, and a third portion 70 extending from the second portion toward the free end and off-set at an inclination to the second portion. The three portions of the tail 58 and the head 48 all lie in substantially the same plane, that plane as illustrated in FIG. 2, being the vertical plane when the bar hanger is disposed in its operative position. The third portion 70 and the first portion 66 have axes which are substantially parallel to each other and lie in off-set planes from each other by an amount which, as illustrated in FIG. 3, will permit the end of the tail to be spaced from and clear of the joist structure so that the conduit hanger 40 can extend downwardly without contacting any of the joist structure. Based on conventional sized angle beams utilized for the chords of the joist, the spacing between the axes of the first and third portions is approximately two inches. The inclination of the off-set between the first portion 66 and the second portion 68, and between the second portion 68 and the third portion 70, preferably are each 45° but, although they may be of any convenient angles so that the first and third portions are parallel, the 45° angle is preferable since it provides a minimum bend to at least one of the junctions 72, 74, while in all probability providing minimum stress concentration and maximum load bearing capacity.

In use, the bar hanger is slipped through the space between the vertical legs 20, 22, of either the upper or lower chords, with the axis of the head extending in the same direction as the spacing between the legs and above the tops of the horizontal legs 16, 18. The bar hanger is then rotated 90° so that the axis of the head extends transverse to the legs 16, 18 and with the tail disposed so that the end of the third portion 70 is spaced from the joist structure. The bar hanger is then pulled down until the lower edge 50 of the head abuts and rests on the legs 16, 18 of both chords. The neck 52 or equivalent alignment surfaces on the upper portion of the tail can maintain the proper alignment until the conduit hanger rod 42 is connected thereto. When the conduit is connected to the conduit hanger, its weight will maintain the head 48 of the bar hanger tightly against the tops of the chord so that both chords support the load of the conduit.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A bar hanger for supporting a conduit hanger or the like from a joist of a building, said joist including a pair of chords each having a substantially horizontal top surface including a space therebetween; said bar hanger comprising a head having an axis of elongation extending in a first direction, and a tail; said tail having a first portion secured to said head and elongated along a first axis substantially normal to said axis of elongation of said head, a second portion extending from and inclined relatively to said first portion, and a third portion extending from and inclined relatively to said second portion and terminating at a free end; said third portion being elongated along an axis substantially parallel to and off-set from said first axis; said head and said tail lying in substantially the same plane; the width of said head and at least a part of said first portion adjacent said head normal to said plane being less than the width of said space, and the length of said head in said first direction in said plane being larger than the width of said space, such that said head and at least said part of said first portion may be passed through said space to dispose the head above said top surface and permit said bar hanger to be turned 90° to operatively position said head on the top surface of both chords with the free end extending downwardly; and connecting means at said free end for connecting to said conduit hanger.

2. A bar hanger as recited in claim 1, wherein said second portion in is inclined approximately 45° to said first portion and to said third portion.

3. A bar hanger as recited in claim 1, wherein said first and third axes are off-set approximately two inches.

4. A bar hanger as recited in claim 1, wherein said connecting means comprises external threads extending from said free end at least partly along said third portion.

5. A bar hanger as recited in claim 1, wherein said connecting means comprises a socket having internal threads.

6. A bar hanger as recited in claim 1, wherein said chords each includes a downwardly depending leg separated by said space, and said bar hanger includes spaced apart oppositely disposed surfaces formed adjacent said head for alignment of said third portion relatively to said space.

7. A bar hanger as recited in claim 6, wherein said head includes an integral neck and said spaced apart operatively disposed surfaces are formed on said neck.

8. A bar hanger as recited in claim 1, wherein said top surface of said chords are substantially planar and said head includes an elongated planar surface along the bottom thereof.

* * * * *